United States Patent
Schaeffer et al.

[11] Patent Number: 5,352,066
[45] Date of Patent: Oct. 4, 1994

[54] MINE ROOF/BOLT ANCHOR ASSEMBLY AND METHOD OF INSTALLATION THEREOF

[75] Inventors: Charles W. Schaeffer, Lebanon, Pa.; Raymond L. Wright, Syracuse, N.Y.

[73] Assignees: The Eastern Company, Syracuse, N.Y.; Birmingham Bolt Co., Inc., Birmingham, Ala.

[21] Appl. No.: 798,199

[22] Filed: Nov. 26, 1991

[51] Int. Cl.$^5$ .................................. E21D 20/20
[52] U.S. Cl. .................. 405/259.6; 405/259.4; 411/55; 411/73; 411/82
[58] Field of Search ............ 405/259.1, 259.4, 259.5, 405/259.6; 411/71, 72, 73, 82, 55, 60, 258, 930

[56] References Cited

U.S. PATENT DOCUMENTS

| | | | |
|---|---|---|---|
| Re. 16,062 | 5/1925 | Tomkinson | 411/73 X |
| 2,783,673 | 3/1957 | Lewis et al. | |
| 3,528,253 | 9/1970 | Kovacs | 411/60 |
| 3,618,326 | 11/1971 | Montgomery | 405/259.6 |
| 3,702,060 | 11/1972 | Cumming | |
| 4,360,301 | 11/1982 | Mosberger | 411/73 X |
| 4,904,123 | 2/1990 | Calandra, Jr. et al. | |
| 4,913,593 | 4/1990 | Clark et al. | |
| 5,078,547 | 1/1992 | Calandra et al. | 405/259.5 |

FOREIGN PATENT DOCUMENTS

| | | | |
|---|---|---|---|
| 254174 | 5/1949 | Switzerland | 411/55 |
| 1182227 | 2/1970 | United Kingdom | |

OTHER PUBLICATIONS

Frazier & Jones Co., F2B Slotted 2 Leaf Bail Type Assembly for 1⅜" Hole, May 1971.
Bethlehem Steel Shell Type C1, Jul. 1970.

*Primary Examiner*—Randolph A. Reese
*Assistant Examiner*—John Ricci
*Attorney, Agent, or Firm*—Shlesinger, Arkwright & Garvey

[57] ABSTRACT

The present invention is directed to an anchor assembly for installing a threaded mine-roof bolt under tension in a bore hole formed in underground passageways, mines, and the like. The anchor assembly includes a two compartment resin cartridge and a mechanical expansion unit. A support collar is threaded on the bolt to restrict axial movement of the mechanical expansion unit. The mechanical expansion unit includes a camming plug and an expansion shell. The expansion shell has a plurality of fingers extending upwardly from an annular collar. Spaces or slots are formed between adjacent fingers. Each of the plurality of fingers include a vertically extending rib for forming channels between the external surfaces of the fingers and the side walls of the bore hole to permit the free flow of resin. The side surfaces of the fingers adjacent the uppermost portion thereof are tapered so that substantially V-shaped notches are formed between adjacent fingers. Vertically extending recesses are formed in the camming plug. At least one of the vertically extending recesses of the camming plug is aligned with at least one V-shaped notch formed in the mechanical expansion shell. This arrangement of aligning at least one recess and one V-shaped notch further facilitates the free flow of resin about the anchor assembly components.

15 Claims, 2 Drawing Sheets

MINE ROOF/BOLT ANCHOR ASSEMBLY AND METHOD OF INSTALLATION THEREOF

FIELD OF THE INVENTION

The present invention relates to anchor assemblies for securing a conventional mine roof bolt under tension to a competent substrate. More specifically, the instant invention pertains to anchor assemblies having both a mechanical anchoring unit and a resin bonding unit for securing a tensioned bolt to a substrate.

BACKGROUND OF THE INVENTION

Various anchor assemblies have been used to reinforce underground passageways, mines and the like to minimize the hazards associated therewith. Well known anchor assemblies include full column resin systems, mechanical expansion systems and combined resin-mechanical expansion systems. The present invention is particularly useful in the latter type of anchor systems, i.e. combined resin-mechanical expansion systems. However, it will be readily appreciated that the present invention may be used in solely mechanical expansion systems.

Combined resin-mechanical expansion systems generally include a two compartment cartridge consisting of a resin and a catalyst and an anchor assembly threaded on a mine roof bolt. An example of such an assembly is disclosed in U.S. Pat. No. 4,664,561 assigned to the assignee of the present invention. The anchor assembly therein includes a bearing plate resting on the head of the bolt and a mechanical expansion unit threaded onto the opposite end thereof. Conventionally, mechanical expansion units include a camming plug and an expandable shell. Further, a bail or threaded support nut is used in conjunction with the mechanical expansion unit to support the expandable shell during installation of the bolt. The two compartment cartridge is inserted into a bore hole formed in a substrate followed by the anchor assembly threaded on a bolt. Once the resin cartridge is punctured by the insertion of the anchor assembly a sufficient distance in the bore hole, the resin and the catalyst flow downwardly about the components of the anchor assembly to surround the same.

The mechanical expansion unit is activated by rotating the bolt relative to the expansion shell and the camming plug to draw the camming plug downwardly thereby forcing the fingers of the expandable shell into engagement with the sidewalls of the bore hole. In this manner, the bolt is mechanically secured to the substrate. The bolt is further supported in the bore hole of the substrate by the resin when hardened.

After the shell has been fully expanded, further rotation of the bolt causes the camming plug to be drawn down into the expansion shell and thereby create tension in the bolt shank. This forces the bearing plate against the roof of the substrate to compresses the competent strata into a beam. This procedure significantly improves the load bearing characteristics of the roof of the substrate.

Conventional mine roof bolts have a diameter of at least $\frac{5}{8}''$. Also, it has been known to provide an expandable shell having $1\frac{1}{4}$ outside diameter for use with the previously identified mine-roof bolts. When members of these dimensions are employed, it is customary to bore a hole in the competent strata slightly larger than $1\frac{1}{4}''$. However, it has been found desirable to form smaller bore holes, for example, slightly greater than $1''$ as is explained in U.S. Pat. No. 4,913,513. In these instances, a conventional $\frac{5}{8}''$ bolt is still used. However, to permit insertion of the anchor assembly into the bore hole, it is necessary to reduce the size of the expandable shell. More specifically, an expandable shell having approximately $1''$ outer diameter is employed. It has been found, when installing mine roof bolts in the smaller bore holes using the scaled down expandable shells, that the flow of the resin and catalyst downwardly from the upper surface of the camming plug is sometimes inhibited. Restricted flow of the resin and catalyst may preclude the resin from flowing evenly about the camming plug and the expandable shell as well as the other components of the anchor assembly and the bolt to secure the same to the inside walls of the bore hole. Accordingly, the bonding effect of the resin may be minimized.

OBJECTS AND SUMMARY OF THE INVENTION

An object of the present invention is to provide an improved combined resin-mechanical bolt anchor assembly eliminating the aforementioned disadvantages of conventional systems.

Another object of the present invention is to provide a combined resin-mechanical bolt anchor assembly which permits the free flow of the resin cartridge components about the anchor assembly to insure proper resin bonding between the anchor assembly and the walls of a bore hole.

A further object of the present invention is to provide a combined resin-mechanical bolt anchor assembly having an expandable shell which may readily be inserted into a bore hole of approximately $1''$ in diameter while permitting the free flow of the cartridge components thereabout.

still a further object of the present invention is to provide a combined resin-mechanical bolt anchor assembly including an expandable shell having a plurality of ribs formed thereon for creating channels or passageways between the fingers of the expandable shell and the side walls of the bore hole to facilitate the free flow of resin and catalyst components of the cartridge.

Yet another object of the present invention is to provide a combined resin-mechanical anchor assembly that includes a mechanical expansion shell having a plurality of fingers the upper areas of which are tapered to form substantially V-shaped notches for facilitating the flow of resin about the expandable shell.

These and other objects of the present invention will be readily understood from the following detailed description of the preferred embodiments.

In summary, the present invention is directed to an anchor assembly for installing a threaded mine roof bolt under tension in a bore hole formed in underground passageways, mines, and the like. The anchor assembly includes a two compartment resin cartridge and a mechanical expansion unit. A support collar is threaded on the bolt to restrict axial movement of the mechanical expansion unit. The mechanical expansion unit includes a camming plug and an expandable shell. The expandable shell has a plurality of fingers extending upwardly from an annular collar. Spaces or slots are formed between adjacent fingers. Each of the plurality of fingers include a vertically extending rib for forming channels between the external surfaces of the finger and the side walls of the bore hole to permit the free flow of resin. The side surfaces of the fingers adjacent the uppermost portion thereof are tapered so that substantially V-shaped notches are formed between adjacent fingers. Vertically extending recesses are formed in the camming plug. At least one of the vertically extending recesses of the camming plug is aligned with at least one V-shaped notch formed in the mechanical expansion shell. This arrangement of aligning at least one recess with at least one V-shaped notch further facilitates the free flow of resin about the anchor assembly components.

DETAILED DESCRIPTION OF THE PREFERRED EMBODIMENT OF THE PRESENT INVENTION

The preferred embodiment of the present invention will be described with reference made to FIGS. 1–7.

FIGS. 1 THROUGH 4

Figure 1:
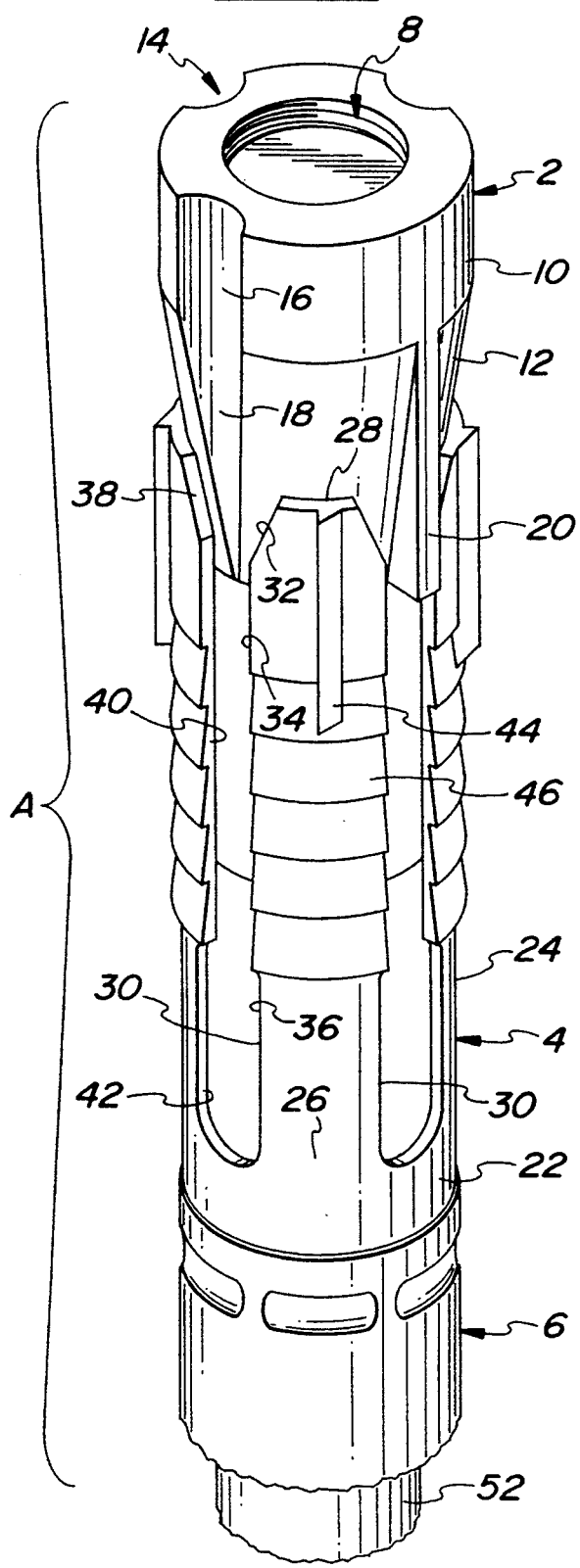
FIG. 1 is a fragmentary perspective view of an anchor assembly formed in accordance with the present invention.
Figure 2:
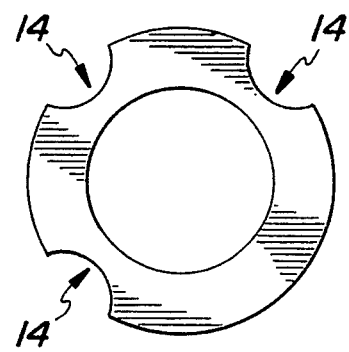
FIG. 2 is a top elevational view of the camming plug.
Figure 3:
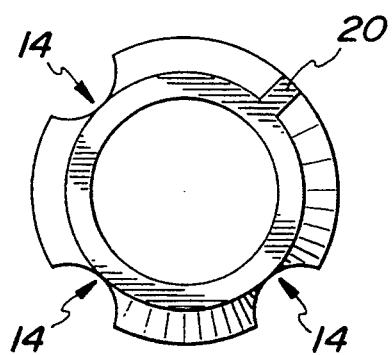
FIG. 3 is a bottom elevational view of the camming plug.

Referring to FIG. 1, the mechanical anchor assembly A of the present invention includes a camming plug 2, a mechanical expansion shell 4 and a support collar 6. The camming plug 2 has an internal bore 8 which is threaded along its entire length. The camming plug 2 has a first portion 10 and a second portion 12. The first portion 10 has a substantially constant diameter while the second portion 12 is tapered inwardly. Three recesses 14 are formed in the external surface of the camming plug 2. Recesses 14 are spaced 90° apart from each other and include a first segment 16 which extends along the length of first portion 10 and a second segment 18 which extends along the length of second portion 12. The first segment 16 has a substantially constant width while the second segment 18 is tapered such that segment 18 narrows as it extends downwardly towards the bottom of camming plug 2. A rib 20 extends vertically along the external surface of the camming plug 2 opposite one of the recesses 14 and is positioned between the remaining two recesses 14.

Mechanical expansion shell 4 includes an annular collar 22 and four evenly spaced fingers 24. Each of the fingers 24 includes a lower surface 26, an upper surface 28 and side surfaces 30. The fingers 24 are integrally connected to annular collar 22 adjacent lower surfaces 26. The side surfaces 30 include a first section 32, second section 34 and a third section 36. First section 32 extend downwardly from corresponding upper surfaces 28 and forms an angle greater than 90° therewith. Second sections 34 extend downwardly from corresponding first sections 32 and form an angle of greater than 90° therewith. Third sections 36 are arcuately shaped and extend downwardly from corresponding second sections 34. As is readily seen in FIG. 2, due to the configurations of the first, second and the third sections 32, 34 and 36, respectively, the spaces or slots formed between adjacent fingers have a substantially V-shaped upper portion 38, a substantially uniform width channel portion 40 and an oblong opening portion 42. Of course, since four fingers are integrally connected to collar 22 four spaces or slots are formed between adjacent fingers 24. Three of the slots or spaces are aligned with the three recesses 14. The remaining slot or space is aligned with rib 20 of camming plug 2.

Figure 4:
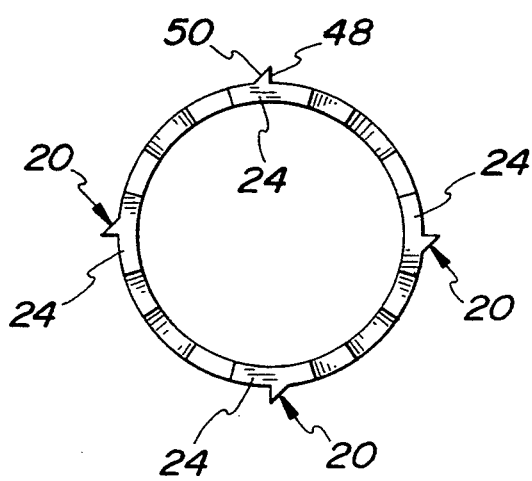
FIG. 4 is a top elevational view of the mechanical expansion shell.

Each of the fingers 24 include a vertically extending rib 44. A plurality of horizontally oriented serrations 46 are formed on each of the fingers 24. The serrations 46 are concentrated along the second sections 34. The serrations 46 are oriented in a similar manner to that disclosed in U.S. Pat. No. 4,913,513. Vertical ribs 44 extend from the corresponding upper surfaces 28 downwardly and terminate short of the second horizontally extending serration 46. The positioning of the ribs 44 directly adjacent the corresponding upper surfaces 28 is important in ensuring the free downward flow of resin and catalyst. In this regard, it is noted that the widest point of the anchor assembly A is the camming plug 2 and the adjacent portion of the expansion shell 4. Thus, by locating the ribs about the widest portion of the anchor assembly A, it is possible to ensure relatively unrestricted flow of the resin and catalyst materials. The ribs 44 have a substantially triangular cross-section, as is best seen in FIG. 4. The ribs 44 include two external surfaces 48 and 50. Surface 48 is oriented such that it is perpendicular to a tangent taken at the point of intersection between surface 48 and the corresponding finger 24. Also, the surface 48 extends in a plane which passes through the center of the mechanical expansion shell 4. Accordingly, the surfaces 48 of oppositely disposed ribs 44 lie in a common plane. The surfaces 50 form an acute angle with the corresponding surfaces 48.

The support collar 6 is of the type disclosed in co-pending U.S. Patent Application Serial No. 515,838 filed on Apr. 27, 1990 now U.S. Pat. No. 5,073,054 the disclosure of which is incorporated herein by reference. The support collar 6 functions to maintain the expansion shell 4 in operable association with the camming plug 2 during installation of the anchor assembly A of the present invention. For the structural particulars as well as the functional particulars of the support collar 6, reference should be had to the above-identified co-pending U.S. Patent application.

Although not shown, it will be readily appreciated that bolt 52 has a conventional head formed at the exposed end thereof, i.e. the end protruding from the bore hole. A conventional bearing plate (not shown) rests on the head of the bolt.

METHOD OF INSTALLATION

The preferred method of installing the anchor assembly of the present invention will be described with reference made to FIGS. 5 through 7.

Figure 5:
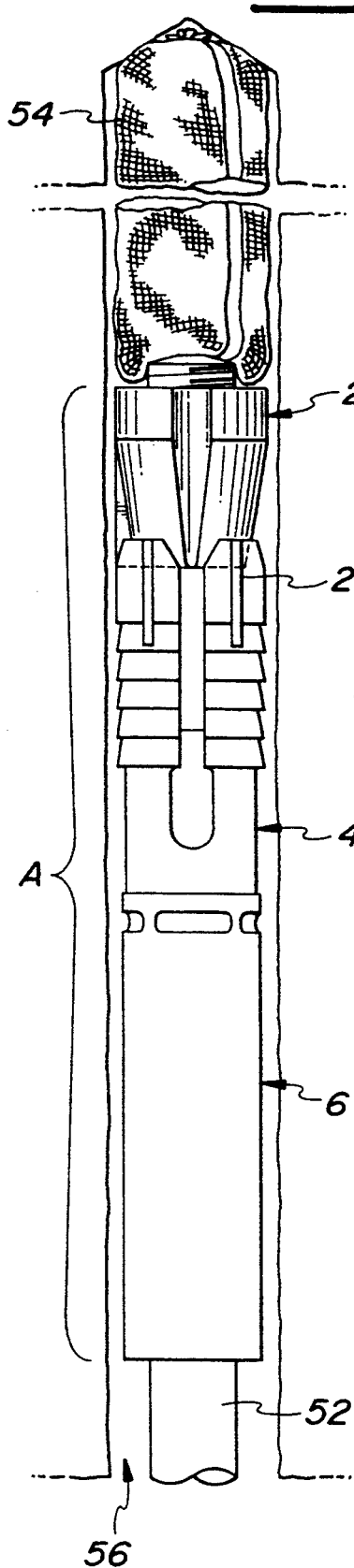
FIG. 5 is a front elevational view of the combined resin-mechanical anchor assembly of the present invention upon initial installation thereof in a bore hole.

Referring to FIG. 5, a resin/catalyst cartridge 54 is inserted into bore hole 56 forward of and along with the mechanical anchor assembly A. As is readily seen in FIG. 6, once the resin cartridge 54 abuts against the uppermost area of bore hole 56 further movement of the mechanical anchor assembly A will rupture the same.

Once the cartridge 54 is ruptured, the resin and catalyst flow downwardly along the components of the mechanical anchor assembly A. Referring to FIG. 6, ribs 44 form channels or passageways between external surfaces 58 of fingers 24 and the sidewalls of the bore hole 56, thus assuring the free downward flow of the catalyst and resin components.

Ribs 44 also serve to prevent the expandable shell 4 from rotating relative to the sidewalls of bore hole 56 upon rotation of bolt 52. More specifically, the surfaces 48 of the upper and lower ribs 44 (as oriented in FIG. 4) prevent the expansion shell 4 from rotating relative to the sidewalls of the bore hole in the clockwise direction. The surfaces 48 of the left and right ribs 44 (as oriented in FIG. 4) preclude the expansion shell 4 from rotating relative to the sidewalls of the bore hole in the center clockwise direction. This arrangement enables the installer to rotate the bolt 52 in either the clockwise or counter clockwise direction. As previously noted, the surfaces 48 of oppositely disposed ribs 44 are in a common plane. This arrangement helps to ensure that the forces acting on the expansion shell 4 to prevent relative rotation between it and the sidewalls of the bore hole 56 are balanced. This feature is desirable, since unbalanced forces may lead to distortion or disconfiguration of the mechanical expansion shell 4. The fingers 24 which engage the lower or second section 12 of camming plug 2 prevent relative rotation between the expansion shell 4 and camming plug 2. Rib 20 also prevents relative rotation between these two members. Thus, once the ribs 44 engage the sidewalls of the bore hole 56, neither the camming plug 2 nor the expansion shell 4 is permitted to rotate relative to the bore hole 56.

As the bolt 52 is rotated the camming plug is drawn downwardly toward annular collar 22 thereby causing the fingers 24 to expand outwardly and anchor along the sidewalls of the bore hole 56. The triangular configuration of ribs 42 readily permits the same to cut through the rock forming the sidewalls of the bore hole to permit the serrations 46 to embed in the sidewalls of the bore hole and anchor the assembly A thereto.

Figure 6:
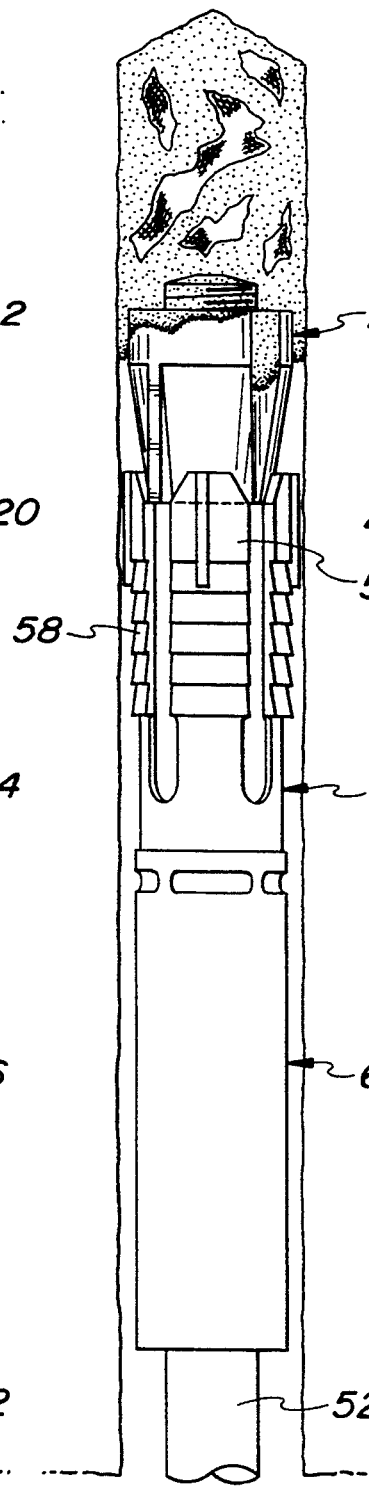
FIG. 6 is a front elevational view similar to that of FIG. 5 but with the anchor assembly rotated slightly to show the relationship between the ribs and the sidewalls of the bore hole.
Figure 7:
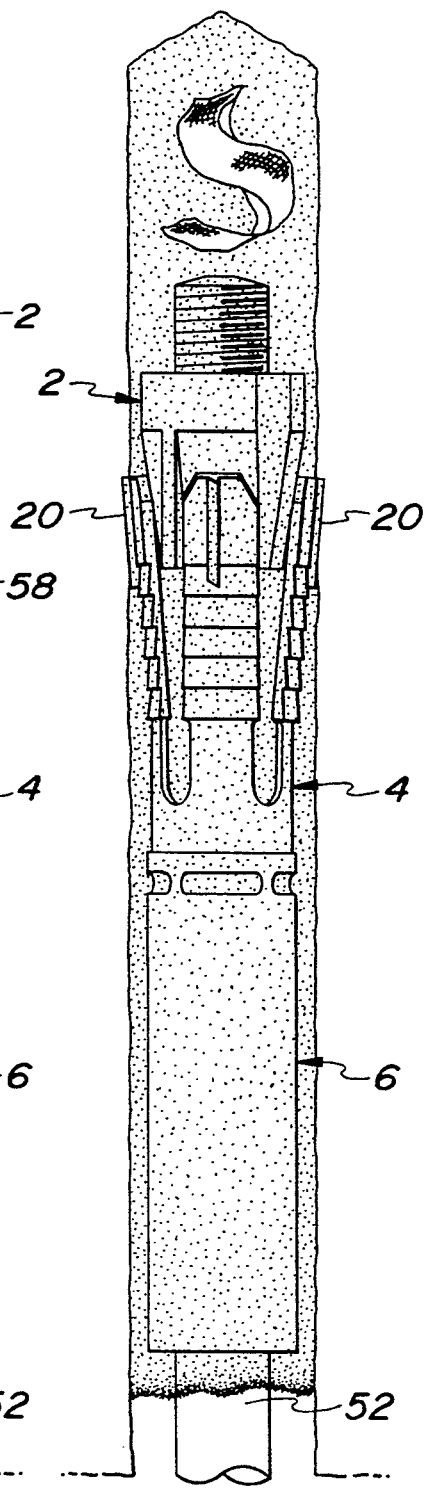
FIG. 7 is a front elevational view of the anchor assembly of the present invention in the fully expanded position.

As is readily seen in FIGS. 5 through 7, three of the V-shaped notches 38 are aligned with the three recesses 14 formed in camming plug 2. Also, the V-shaped notches 38 are formed in the upper surface of the mechanical expansion shell 4 adjacent ribs 44. This arrangement of the recesses 14, V-shaped notches 38 and ribs 44 facilitates the free flow of resin and catalyst downwardly about the components of the anchor assembly A. Furthermore, the oblong shaped opening 42 assists in the downward flow of the resin. The V-shaped notches 38 are one of a number of salient features of the present invention. More specifically, the reduced sized expansion shell 4 necessarily has slots formed between adjacent fingers having a width substantially smaller than found in an expansion shell having a 1¼ diameter. Thus, the V-shaped notches 38, increase the passageway for the flow of resin and catalyst at the area where most need, i.e. the area adjacent the camming plug 2.

It will be readily appreciated that the V-shaped notches 38 extend along only a portion of the fingers 24. This arrangement ensures that the horizontal serrations 46 will have the maximum permissible circumferential span. More specifically, if the sides 30 of the fingers 24 were tapered from the upper surface 28 to the lower surface 46, the span of the uppermost horizontal serrations 26 would be significantly reduced. Accordingly, there would be less area of engagement between the mechanical expansion shell 4 and the sidewalls of the bore hole 56. This feature of the present invention is important especially where the mechanical expansion shell 4 has been reduced in size.

It will be readily appreciated that the present invention is a significant improvement over previously known devices. More specifically, the present invention permits the free flow of resin and catalyst downwardly about the components of the mechanical anchor assembly A to insure proper bonding between said components and the sidewalls of the bore hole 56.

While this invention has been described as having a preferred design, it is understood that it is capable of further modifications, uses and/or adaptions of the invention following in general the principle of the invention including such departures from the present disclosure as come within the known or customary practice in the art to which the invention pertains, and as may be applied to the central features set forth and fall within the scope of the invention and the limits of the appended claims.

We claim:

1. An anchor assembly operably associated with a bore hole in a substrate for anchoring a tensioned bolt to the substrate, comprising:
   a) mechanical expansion means for mechanically coupling the tensioned bolt to the substrate, said mechanical expansion means including a mechanical expansion shell;
   b) said mechanical expansion shell including an annular collar and a plurality of fingers operably associated therewith;
   c) said plurality of fingers each having inner, outer, upper, lower and side surfaces, said lower surfaces of said plurality of fingers being integrally connected to said annular collar;
   d) said side surfaces of each of said plurality of fingers including first and second portions, said first portions extend from corresponding upper surfaces and form an angle greater than 90° therewith, said second portions extend downwardly from said first portions and form an angle greater than 90° therewith;
   e) at least one of said plurality of fingers includes a first rib formed on said outer surface, said first rib extending downwardly from an uppermost portion of said at least one of said plurality of fingers.
   f) said first rib includes first and second faces, said first face extends substantially perpendicular to a tangent taken at a point where said first face intersects said outer surface of said at least one finger; and
   g) said second face forms an angle less than 90° with said first face.

2. An anchor assembly operably associated with a bore hole in a substrate for anchoring a tensioned bolt to the substrate, comprising:
   a) mechanical expansion mean for mechanically coupling the tensioned bolt to the substrate, said mechanical expansion means including a mechanical expansion shell;
   b) said mechanical expansion shell including an annular collar and a plurality of fingers operably associated therewith;
   c) said plurality of fingers each having inner, outer, upper, lower and side surfaces, said lower surfaces of said plurality of fingers being integrally connected to said annular collar;

d) said side surfaces of each of said plurality of fingers including first and second portions, said first portions extend from corresponding upper surfaces and form an angle greater than 90° therewith, said second portions extend downwardly from said first portions and form an angle greater than 90° therewith;

e) at least one of said plurality of fingers includes a first rib formed on said outer surface, said first rib extending downwardly from an uppermost portion of said at least one of said plurality of fingers;

f) said at least one finger includes a plurality of horizontally extending teeth; and g) said rib extends above and below at least one of said teeth.

3. An anchor assembly operably associated with a bore hole in a substrate for anchoring a tensioned bolt to the substrate, comprising:

a) mechanical expansion means for mechanically coupling the tensioned bolt to the substrate, said mechanical expansion means including a mechanical expansion shell;

b) said mechanical expansion shell including an annular collar and a plurality of fingers operably associated therewith;

c) said plurality of fingers each having inner, outer, upper, lower and side surfaces, said lower surfaces of said plurality of fingers being integrally connected to said annular collar, said plurality of fingers include a first pair of diametrically opposed fingers; and, d) said diametrically opposed fingers each having a rib formed thereon, each rib having first and second faces, said first faces of said ribs formed on said diametrically opposed fingers extend in substantially a first common plane, said second faces of said ribs being disposed on opposite sides of the first common plane.

4. An anchor assembly as in claim 3, wherein:
a) the common plane passes through the center of said mechanical expansion shell.

5. An anchor assembly as in claim 3, wherein:
a) a substantially V-shaped notch is formed between adjacent fingers; and,
b) at least a portion of said rib extends along said substantially V-shaped notch.

6. An anchor assembly as in claim 3, wherein:
a) said second faces of said ribs extend in planes which form acute angles with the common plane.

7. An anchor assembly as in claim 3, wherein:
a) said plurality of fingers include a second pair of diametrically opposed fingers, each finger of said second pair includes a rib having first and second faces, said first faces said ribs formed on said second pair of fingers extend in a second common plane, said second faces of said ribs formed on said second pair of fingers are disposed on opposite sides of the second common plane.

8. An anchor assembly as in claim 3, further including:
a) resin bonding means for securing the tensioned bolt to the substrate; and,
b) a camming plug operably associated with said mechanical expansion means, said camming plug includes at least a first recess formed in an outer periphery thereof.

9. An anchor assembly as in claim 8, wherein:

a) at least one V-shaped notch is formed adjacent an upper surface of said mechanical expansion means, said V-shaped notch is aligned with said recess.

10. An anchor assembly operably associated with a bore hole in a substrate for anchoring a tensioned bolt to the substrate, comprising:

a) mechanical expansion means for mechanically coupling the tensioned bolt to the substrate, said mechanical expansion means including a mechanical expansion shell;

b) said mechanical expansion shell including an annular collar and a plurality of fingers operably associated therewith;

c) said plurality of fingers each having upper and lower surfaces, said lower surfaces of each of said plurality of fingers being integrally connected to said annular collar, said plurality of fingers include a first pair of diametrically opposed fingers; and, d) said diametrically opposed fingers each having a vertically extending rib formed thereon, each rib having first and second faces which adjoin and extend from said fingers, said first faces of said ribs formed on said diametrically opposed fingers extend in substantially a common plane, said second faces of said ribs formed on said diametrically opposed fingers extend in different planes from each other.

11. An anchor assembly as in claim 10, further including:

a) resin bonding means for securing the tensioned bolt to the substrate;

b) a camming plug operably associated with said mechanical expansion means, said camming plug includes at last a first recess formed in an outer periphery thereof; and, c) at least one V-shaped notch is formed adjacent an upper surface of said mechanical expansion means, said substantially V-shaped notch is aligned with said recess.

12. An anchor assembly operably associated with a bore hole in a substrate for anchoring a tensioned bolt to the substrate, comprising:

a) mechanical expansion means for mechanically coupling the tensioned bolt to the substrate, said mechanical expansion means including a mechanical expansion shell;

b) said mechanical expansion shell including an annular collar and a plurality of fingers operably associated therewith;

c) said plurality of fingers each having inner, outer, upper, lower and side surfaces, said lower surfaces of said plurality of fingers being integrally connected to said annular collar, said plurality of fingers being spaced from each other thereby forming openings between adjacent fingers;

d) said openings having first, second and third sections, said first section being disposed adjacent said annular collar and said third section being removed from said annular collar, said second section being disposed intermediate said first and third sections, said first section being substantially oval shaped and said third section being substantially v-shaped;

e) at least one of said fingers includes a vertically extending rib, at least a portion of said vertically extending rib extends along the entire length of corresponding substantially v-shaped notch, 13. A method for installing a combined resin and mechanical anchor assembly in a bore hole formed in a substrate for anchoring a tensioned bolt to the substrate, comprising the steps of:
  a) providing resin bonding means for securing a tensioned bolt to a substrate;
  b) providing mechanical expansion means for mechanically coupling the tensioned bolt to the substrate, the mechanical expansion means includes a mechanical expansion shell having an annular collar and a plurality of fingers operably associated therewith, the plurality of fingers each including upper and lower surfaces;
  c) forming at least one substantially V-shaped notch between a pair of adjacent fingers; and,
  d) forming rib means on each of the pair of adjacent fingers for providing a channel to permit resin to flow therethrough, the rib means extending along at least the entire length of the V-shaped notch.

14. A method as in claim 13 including the further step of:
  a) providing a camming plug operably associated with said mechanical expansion shell, the camming plug having at least one recess; and,
  b) aligning the recess with the substantially V-shaped notch and the channel formed by the rib means.

15. An anchor assembly operably associated with a bore hole in a substrate for anchoring a tensioned bolt to the substrate, comprising:
  a) a mechanical expansion means for mechanically copuling the tensioned bolt to the substrate, said mechanical expansion means including a mechanical expansion shell having a longitudinal axis;
  b) said mechanical expansion shell having an annular collar and a plurality of fingers operably associated therewith, said plurality of fingers each including upper, lower, inner and outer surfaces;
  c) at least one substantially v-shaped notch being formed between a pair of adjacent fingers;
  d) at least one of said pair of adjacent fingers having at least one rib extending along the longitudinal axis of said mechanical expansion shell, said rib includes first and second faces, said first face extends substantially perpendicular to a tangent taken at a point where said first face intersects said outer surface of said at least one finger; and,
  e) said second face forms an angle less than 90° with said first face.

* * * * *